April 12, 1927.  F. DE LUCA  1,624,780
WHEEL
Filed Sept. 25, 192
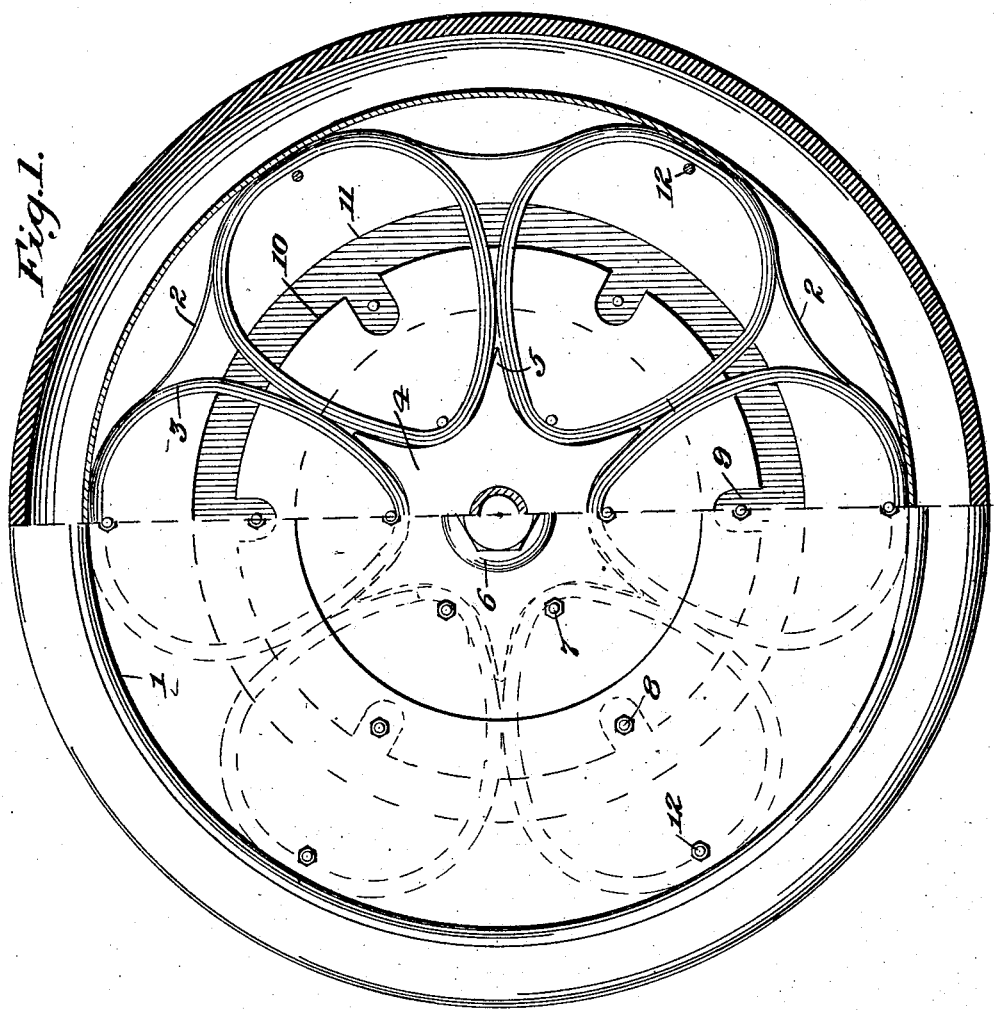
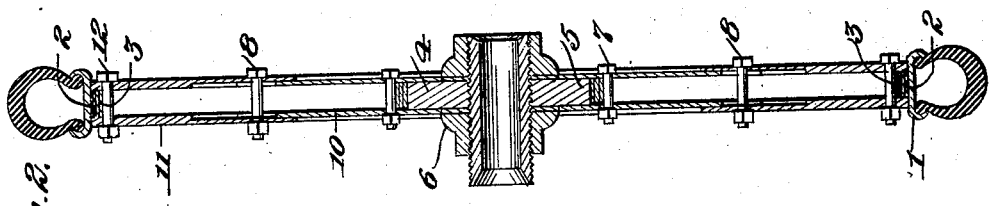
Inventor:
F. DeLuca,
by Langner, Parry, Card & Langner
Att'ys.

Patented Apr. 12, 1927.

1,624,780

UNITED STATES PATENT OFFICE.

FRANCISCO DE LUCA, OF SANTIAGO DE CHILE, CHILE.

WHEEL.

Application filed September 25, 1924. Serial No. 739,905.

This invention refers to an elastic wheel, which has many advantages compared with the wheels used at present and which avoids many disadvantages of the present wheels, as explained later on.

The wheels used at present for railways, motor cars, animal drawn cars, etc., are rigid wheels, not elastic wheels, which have many disadvantages, subjecting both tracks and cars to excessive wear and tear and making moreover the traveling in the cars " hard" and disagreeable, especially on bad roads.

The elastic wheel of my invention avoids all these disadvantages, being elastic, useful and light and above all safe and economical. With my elastic wheel injury to railway lines and damage to the cars themselves are avoided for the following reason:

At present the jump of a car when passing over a joint of the rails produces a short heavy vibration in view of the fact that the vibration is only taken up from the springs upwards. But from the springs to the rails are several tons of unsprung weight which produce after every jump a heavy short vibration. This is obviated in the use of my elastic wheel since the deadweight which remains consists only of the weight of the rim of the wheel, which never exceeds from 50 to 60 kilograms. With my elastic wheel even motor car accidents are avoided, for the following reason:

Regardless of whether the wheel is provided with a pneumatic tire, or tire of any type, said tire never has to stand so much strain as at present when applied to the ordinary kind of wheels, in view of the fact—as mentioned above—that there is an elastic construction between axle and the rim of the wheel which absorbs all heavy short vibrations. Besides this there is the advantage that axle-ends, moving parts, gears and especially the differential last much longer, not to mention the change speed gear. My elastic wheel does away with the need for all special apparatus or buffers for the purpose of taking up heavy shocks, without the risk of breaking springs and axles and obtaining at the same time smooth riding. Many advantages are obtained by the application of my elastic wheel to animal-drawn cars, through their low initial cost and easy adaption, and more work can be gotten out of the animal as it is possible to lower the proportional-weight of the car the entire load to 50 per cent of the original present proportional-weight. In one word, the benefits obtained with the application of my elastic wheel are numerous owing to the fact that it is firm, light, useful and cheap.

In the drawings:

Fig. 1 is a side view half in elevation and half in section showing a single embodiment of the present invention.

Fig. 2 is a diametrical cross section taken in the line of the bolts.

Referring now in detail to the several figures the wheel is composed of the iron rim 1 adapted for use with either a pneumatic tire or for a simple cushion tire. Joined to the rim is an undulating circumferential resilient member 2 having a number of depressions, in the present instance 6, serving as seats for the broad ends of ovoid leaf springs 3 taking the place of the usual wooden spokes of an ordinary wheel bent in the form of so many half moons as the wheel has rings, which may be any desirable number, for instance six. These rings 3 are made of hardened steel blades, the same kind of steel as is used for clock springs, and several blades are used for each ring, each blade being of one piece, and one blade exactly inside the other blade. The thickness of the leaves must be in relation to the weight and kind of the car. For instance, for light small cars for four passengers springs with from four to five leaves each, 5 centimetres broad and one millimetre thick may be used for the spokes with a diameter in relation to the size of the wheel used. For big motor cars and heavy motor trucks, leaves from six to eight and ten centimetres broad and from 1 to 1½, 2 and 3 millimetres thick may be used, and for tramways, railways, etc., the leaves will be much broader and thicker. The steel must be always thin in order to give it elasticity and security, and in order to give it more or less resistance it is only necessary to put more or less steel blades in each ring. These ovoid springs have their rotund ends seated in the depressions of the undulating member 2 and their pointed ends directed toward the center. They are round outside the wheel, and take an oval form when forced inside the wheel, which form gives them the necessary elasticity and an expansion-force of each ring against the others, holding them firmly in place. A star shaped hub 4 is also held in place by the expansive pressure of the ovoid springs, the pointed ends of which engage peripheral seats in said hub. This hub may be of stamped steel in order to lighten the construction of the wheel. The elasticity of the wheel is at all times distributed among all the springs.

When the weight of the car loads the spring which is immediately below the axle, the spring expands towards the sides, and in order to be able to expand, it has to push against the two springs at its sides, which push against the next springs, until the pressure has been transmitted to the spring which is immediately over the axle, which takes a more oval form, expanding upwards and downwards, to the sides, so that the springs keep the wave of force transmission shifting from one spring to another through the series of springs. There will be little wear and tear for the spring and undulating member are not secured together but are in a state of floating contact so that they do not often make mutual contact at the same points.

The wheel with discs will be in the following form:

There will be two discs 10 fixed relative to the hub with a diameter a little greater than the hub, fixed in place by nuts 6, and the retaining bolts 7; said bolts touch the inside of the ovoid springs and serve as a stop to prevent their bodily movement outwardly. The rest of the wheel will be covered by two annular disc-pieces 11 which telescope over the discs 10 and are fixed to the rim. Other retaining bolts 12 pass through the disc-pieces 11 and make contact with the inner surfaces of the ovoid springs adjacent their outer ends, preventing them shifting bodily inward away from the undulating body 2. There may be three or more safety bolts 8. These bolts are fixed near the inner edges of the annular discs. The other discs have slots encompassing the bolts 8 which are sufficiently larger than said bolts to allow for the maximum elastic movement permissible between the wheel parts.

Having now fully described the nature of my invention and its application, what I claim as my property is:

1. A resilient wheel comprising a rim and a hub, an undulating spring member arranged circumferentially within said rim, leaf spring rings of ovoid shape having the broad ends seated in the undulations of said spring member and yieldingly coacting therewith under deformation of said rings, the apices of said rings being seated in suitable depressions in said hub.

2. A resilient wheel comprising a rim and a hub, an undulating spring member arranged circumferentially within said ring, leaf spring rings of ovoid shape having the broad ends seated in the undulations of said spring member, and yieldingly coacting therewith under deformation of said rings, said rings being arranged for free sliding lateral contact.

3. A resilient wheel as claimed in claim 2 in which the apices of said rings are seated in suitable depressions in the hub.

4. A resilient wheel comprising a rim and a hub, leaf spring rings of ovoid shape having the broad ends seated adjacent the rim and their apices seated adjacent said hub, a casing comprising an annular part carried by said rim and a central part carried by said hub, the walls of said parts freely telescopic in an intermediate zone, bolts passing through said annular part bearing against the inner surfaces of said rings at their broad ends, and bolts passing through said central part bearing against the inner surfaces of said rings adjacent their apices, said rings being otherwise freely floatably mounted with respect to each other and to said casing.

In testimony whereof I have signed my name to this specification.

FRANCISCO DE LUCA.